US011997452B2

(12) United States Patent
Kallas et al.

(10) Patent No.: US 11,997,452 B2
(45) Date of Patent: May 28, 2024

(54) DUAL-AXIS SWIVEL SPEAKER MOUNT ASSEMBLY AND MOUNTING KIT

(71) Applicant: Music Express, LLC, Kingston, WA (US)

(72) Inventors: Ryan Kallas, Kingston, WA (US); J. Herschel Blankenship, Kingston, WA (US)

(73) Assignee: MUSIC EXPRESS LLC, Kingston, WA (US)

(*) Notice: Subject to any disclaimer, the term of this patent is extended or adjusted under 35 U.S.C. 154(b) by 0 days.

(21) Appl. No.: 17/749,087

(22) Filed: May 19, 2022

(65) Prior Publication Data

US 2023/0379616 A1 Nov. 23, 2023

(51) Int. Cl.
*H04R 1/32* (2006.01)
*H04R 1/02* (2006.01)

(52) U.S. Cl.
CPC ............ *H04R 1/323* (2013.01); *H04R 1/026* (2013.01); *H04R 2201/021* (2013.01); *H04R 2201/025* (2013.01)

(58) Field of Classification Search
CPC .. H04R 1/323; H04R 1/026; H04R 2201/021; H04R 2201/025
See application file for complete search history.

(56) References Cited

U.S. PATENT DOCUMENTS

| | | | |
|---|---|---|---|
| 1,630,870 | A | 5/1927 | Strunck |
| 2,204,837 | A | 6/1940 | Waller |
| 2,293,593 | A | 8/1942 | Clark |
| 2,565,999 | A | 8/1951 | Julius |
| 2,628,289 | A | 2/1953 | Olson |
| 2,650,788 | A | 9/1953 | Hulstein |
| 2,896,901 | A | 7/1959 | Levy |
| 2,898,068 | A | 8/1959 | Warren |
| 2,922,609 | A | 1/1960 | Collier |
| 2,947,214 | A | 8/1960 | Schwuttke |
| 3,204,898 | A | 9/1965 | Manning |
| D219,033 | S | 10/1970 | Salsgiver |
| 3,661,376 | A | 5/1972 | Hill |
| 3,936,026 | A | 2/1976 | Hampel |
| 3,971,526 | A | 7/1976 | Underwood |
| 4,034,946 | A | 7/1977 | Zimmer, Jr. |
| 4,068,961 | A | 1/1978 | Ebner |

(Continued)

OTHER PUBLICATIONS

Internet Screenshot of products for sale, https://www.triad-orbit.com/product/slide-in-wall-mounting-plate/, dated Aug. 13, 2020.

(Continued)

*Primary Examiner* — Andrew L Sniezek

(74) *Attorney, Agent, or Firm* — JK Intellectual Property Law, PA

(57) ABSTRACT

A dual-axis swivel speaker mount assembly for mounting a speaker to a supporting object may include a base section for attachment to the supporting object, a central section, and a speaker section for attachment to the speaker; a first and second lockable pivot assemblies are provided for adjustably orienting the speaker section relative to the base section. An optional mounting plate may be employed to mount the speaker assembly in one of two orientations for convenience of mounting and adjusting.

20 Claims, 17 Drawing Sheets

(56) References Cited

U.S. PATENT DOCUMENTS

| | | | | |
|---|---|---|---|---|
| 4,160,541 | A | 7/1979 | Harken | |
| D253,594 | S | 12/1979 | Antenbring | |
| 4,278,223 | A | 7/1981 | Fauteux | |
| 4,304,385 | A | 12/1981 | Farouche | |
| 4,395,010 | A | 7/1983 | Helgeland | |
| 4,470,106 | A | 9/1984 | Norton | |
| D281,317 | S | 11/1985 | Whitaker | |
| 4,564,166 | A | 1/1986 | Craft | |
| 4,660,493 | A | 4/1987 | Lowry, III | |
| 4,690,362 | A | 9/1987 | Helgeland | |
| 4,738,422 | A | 4/1988 | Matheson | |
| 5,024,415 | A | 6/1991 | Purens | |
| 5,092,572 | A | 3/1992 | Litwak | |
| 5,201,896 | A * | 4/1993 | Kruszewski | F16M 11/10 248/278.1 |
| 5,221,070 | A | 6/1993 | Heilmer | |
| D338,882 | S | 8/1993 | Reiter | |
| D362,253 | S | 9/1995 | Vogels | |
| 5,497,965 | A | 3/1996 | Mathieu | |
| 5,522,527 | A | 6/1996 | Tsai | |
| 5,751,548 | A | 5/1998 | Hall | |
| 5,931,102 | A | 8/1999 | Grahl | |
| 5,957,445 | A | 9/1999 | Hagman | |
| D417,872 | S | 12/1999 | Monson | |
| 6,116,554 | A | 9/2000 | Wei | |
| 6,161,741 | A | 12/2000 | French | |
| 6,244,553 | B1 | 6/2001 | Wang | |
| 6,505,988 | B1 | 1/2003 | Oddsen | |
| 6,510,049 | B2 | 1/2003 | Rosen | |
| 6,669,155 | B2 | 12/2003 | Ron | |
| D488,708 | S | 4/2004 | Lam | |
| D499,954 | S | 12/2004 | Brushaber | |
| 7,028,961 | B1 | 4/2006 | Dittmer | |
| D538,633 | S | 3/2007 | LyHau | |
| D539,123 | S | 3/2007 | LyHau | |
| D543,548 | S | 5/2007 | Muday | |
| D552,455 | S | 10/2007 | Moore | |
| D557,126 | S | 12/2007 | Worrall | |
| D595,723 | S | 7/2009 | Bures | |
| D629,405 | S | 12/2010 | Crysell | |
| 8,177,208 | B2 | 5/2012 | Sato | |
| D679,281 | S | 4/2013 | Kaluza | |
| D753,128 | S | 4/2016 | Anderson | |
| D821,365 | S | 6/2018 | Gheysens | |
| D825,535 | S | 8/2018 | Wright | |
| D865,772 | S | 11/2019 | Theisen | |
| D881,167 | S | 4/2020 | Jiao | |
| D915,359 | S | 4/2021 | Zhang | |
| D952,612 | S | 5/2022 | Malone | |
| D969,113 | S | 11/2022 | Kallas | |
| 2003/0026445 | A1 | 2/2003 | Anderson | |
| 2005/0045794 | A1 | 3/2005 | Richter | |
| 2005/0100187 | A1 * | 5/2005 | Yang | H04R 1/026 381/387 |
| 2007/0012825 | A1 | 1/2007 | Yeh | |
| 2008/0061199 | A1 | 3/2008 | Chen | |
| 2009/0308993 | A1 | 12/2009 | Chang | |
| 2013/0230200 | A1 * | 9/2013 | Lau | H04R 1/02 381/332 |
| 2013/0270317 | A1 | 10/2013 | Wang | |
| 2014/0061270 | A1 | 3/2014 | Richter | |
| 2016/0025264 | A1 | 1/2016 | Casagrande | |
| 2019/0368653 | A1 | 12/2019 | Olinger | |
| 2022/0394366 | A1 | 12/2022 | Kallas et al. | |

OTHER PUBLICATIONS

International Search Report for Application No. PCT/CN2023/067160, dated Aug. 14, 2023.

* cited by examiner

DUAL-AXIS SWIVEL SPEAKER MOUNT ASSEMBLY AND MOUNTING KIT

TECHNICAL FIELD

The present disclosure relates generally to assemblies having two swivel axes for securely and adjustably mounting speakers, and kits also including mounts used for securely and adjustably mounting such assemblies.

BACKGROUND

It can be physically and geometrically challenging to mount loudspeakers to surfaces such as walls or ceilings, or to other supporting structures such as struts or frames. Such mounting is particularly challenging in commercial installations such as music venues, theaters, music and/or video production studios, etc., where speakers may be much heavier and larger in size than those for home use. In locations where multiple speakers are being mounted, it may be desirable to mount individual speakers with a particular orientation or aim (e.g., something other than orthogonal the surface or structure to which it is mounted). An inherent conflict exists in certain adjustable mounting systems between adjustability and security.

Accordingly, improvements in speaker mount assemblies and/or systems addressing one or more of the above drawbacks, and/or providing other benefits, would be welcome.

SUMMARY

According to certain aspects of the disclosure, a dual-axis swivel speaker mount assembly for mounting a speaker to a supporting object may include, for example, a base section for attachment to the supporting object; a central section; a speaker section for attachment to the speaker; a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section; and a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section; wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions. Various options and modifications are possible.

For example, the base section may include a base plate defining holes therethrough and two flanges extending upright from the base plate, the first axle extending though the two flanges. Also, the base section may include a base plate defining a plurality of holes therethrough, the holes including two groupings disposed symmetrically and overlappingly relative to a cross-axis in a middle of the base plate. If so, the groupings of holes include a first grouping of four holes and a second grouping of four holes. Such may be used with a mounting plate having mounting holes located around a periphery thereof for mounting the mounting plate to the supporting object, the mounting plate having a U-shaped lip sized for slidingly receiving the base plate therein in either a first orientation or a second orientation. The mounting plate may define four holes therethrough, the first grouping of holes aligning with the four holes of the mounting plate when the base plate is in the first orientation, the second grouping of holes aligning with the four holes of the mounting plate when the base plate is in the second orientation. The four holes may be threaded, with threaded fasteners for securing the base plate to the mounting plate using either the first grouping of holes or the second grouping of holes and the four holes.

In the first orientation the first knob is at a first end of the mounting plate, and in the second orientation the first knob is at a second end of the mounting plate. The U-shaped lip is on a top surface of the mounting plate, and further including a vibration reducing pad on a bottom surface of the mounting plate for contacting the surface onto which the mounting plate is mounted.

The central section includes a cylindrical portion and a plate portion, the first axle extending through the cylindrical portion, the second axle extending through the plate portion. Friction enhancing surface elements may be located at a contact portion of the speaker section and a contact portion of the central section for enhancing the locking of the speaker section relative to the central section when locked by the second lockable pivot assembly.

The speaker section may include a plate portion and a speaker portion, the second axle extending through the plate portion, and the plate portion may define an arcuate groove extending circumferentially around the second axis, and the central section defines a pin extending through the groove configured to guide and secure the plate portion relative to the central section. The speaker portion may be removably mountable to the plate portion in a first orientation and a second orientation, the first orientation being located at 90 degrees rotation from the second orientation.

According to other aspects of the disclosure, a dual-axis swivel speaker mount assembly for mounting a speaker to a supporting object may include, for example, a base section for attachment to the supporting object, the base section including a base plate; a central section; a speaker section for attachment to the speaker; a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section; a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section; wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions; and a mounting plate having mounting holes located around a periphery thereof for mounting the mounting plate to the supporting object, the mounting plate having a U-shaped lip sized for slidingly receiving the base plate therein in either a first orientation or a second orientation; wherein in the first orientation the first knob is at a first end of the mounting plate, and in the second orientation the first knob is at a second end of the mounting plate; and openings defined though the base plate and the mounting plate that are aligned in either the first orientation or the second orientation for receiving fasteners to fix the base plate to the mounting plate in either the first orientation or the second orientation. Again, various options and modifications are possible.

According to still other aspects of the disclosure, a dual-axis swivel speaker mount assembly for mounting a speaker to a supporting object may include, for example, a base section for attachment to the supporting object; a central section; a speaker section for attachment to the speaker; a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section; a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section; wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions; the base section further including a base plate defining a plurality of holes therethrough, the holes including two groupings disposed symmetrically and overlappingly relative to a cross-axis in a middle of the base plate, the groupings of holes including a first grouping of four holes and a second grouping of four holes; and a mounting plate having mounting holes located around a periphery thereof for mounting the mounting plate to the supporting object, the mounting plate having a U-shaped lip sized for slidingly receiving the base plate therein in either a first orientation or a second orientation; wherein the mounting plate further defines four holes therethrough, the first grouping of holes aligning with the four holes of the mounting plate when the base plate is in the first orientation, the second grouping of holes aligning with the four holes of the mounting plate when the base plate is in the second orientation; and wherein in the first orientation the first knob is at a first end of the mounting plate, and in the second orientation the first knob is at a second end of the mounting plate. Again, various options and modifications are possible.

BRIEF DESCRIPTION OF THE DRAWINGS

More details of the present disclosure are set forth in the drawings.

DETAILED DESCRIPTION

Figure 1:
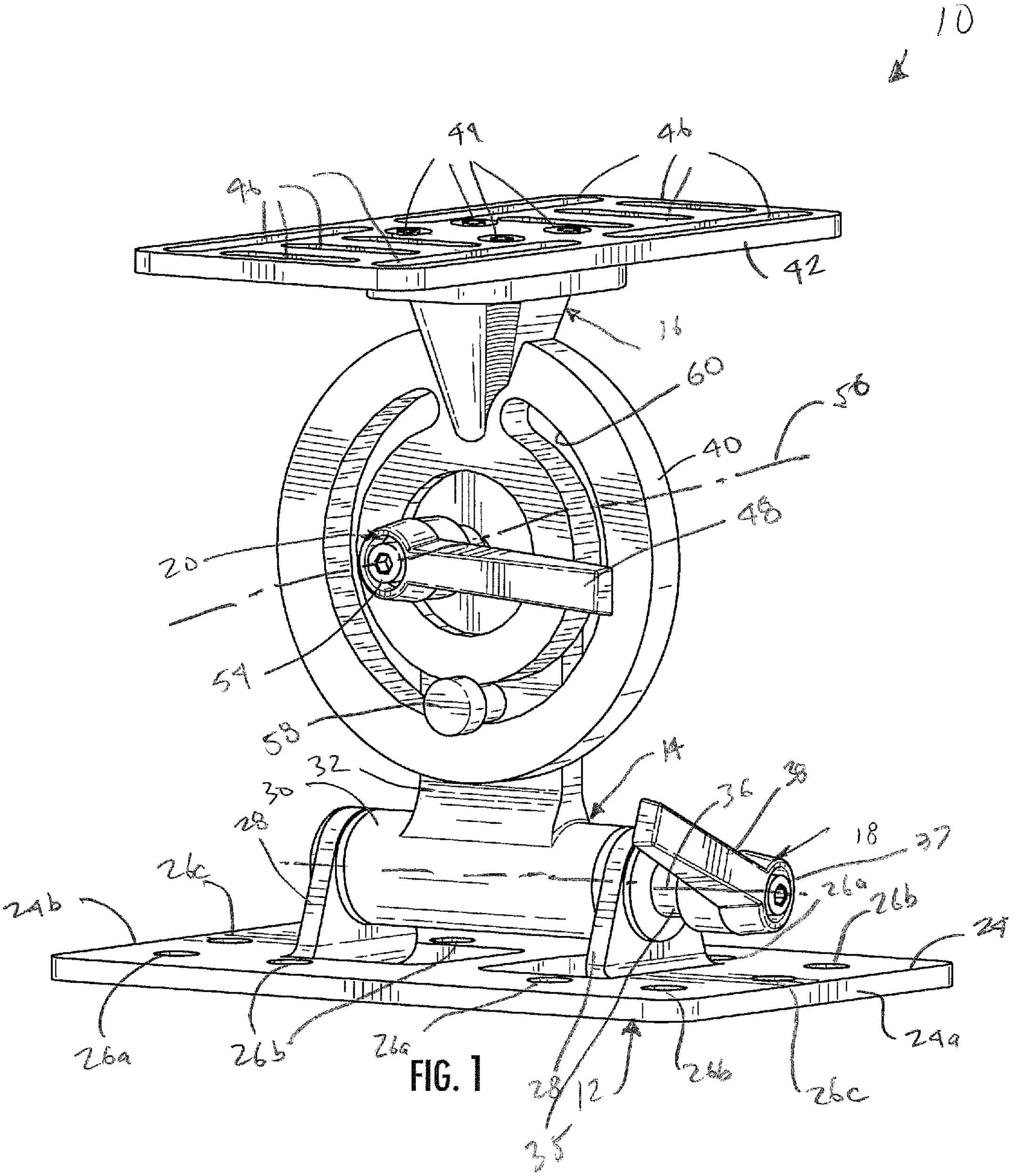
FIG. 1 is a perspective view of a dual-axis swivel speaker mount assembly according to the present design.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. In general, FIGS. 1-12 show aspects of the subject dual-axis swivel speaker mount assembly and mounting kit as would be required for one of ordinary skill in the art to understand, manufacture, and use the subject matter of this disclosure. Other aspects are described below and are found in the claims that follow. Each depicted and/or disclosed embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Figure 8:
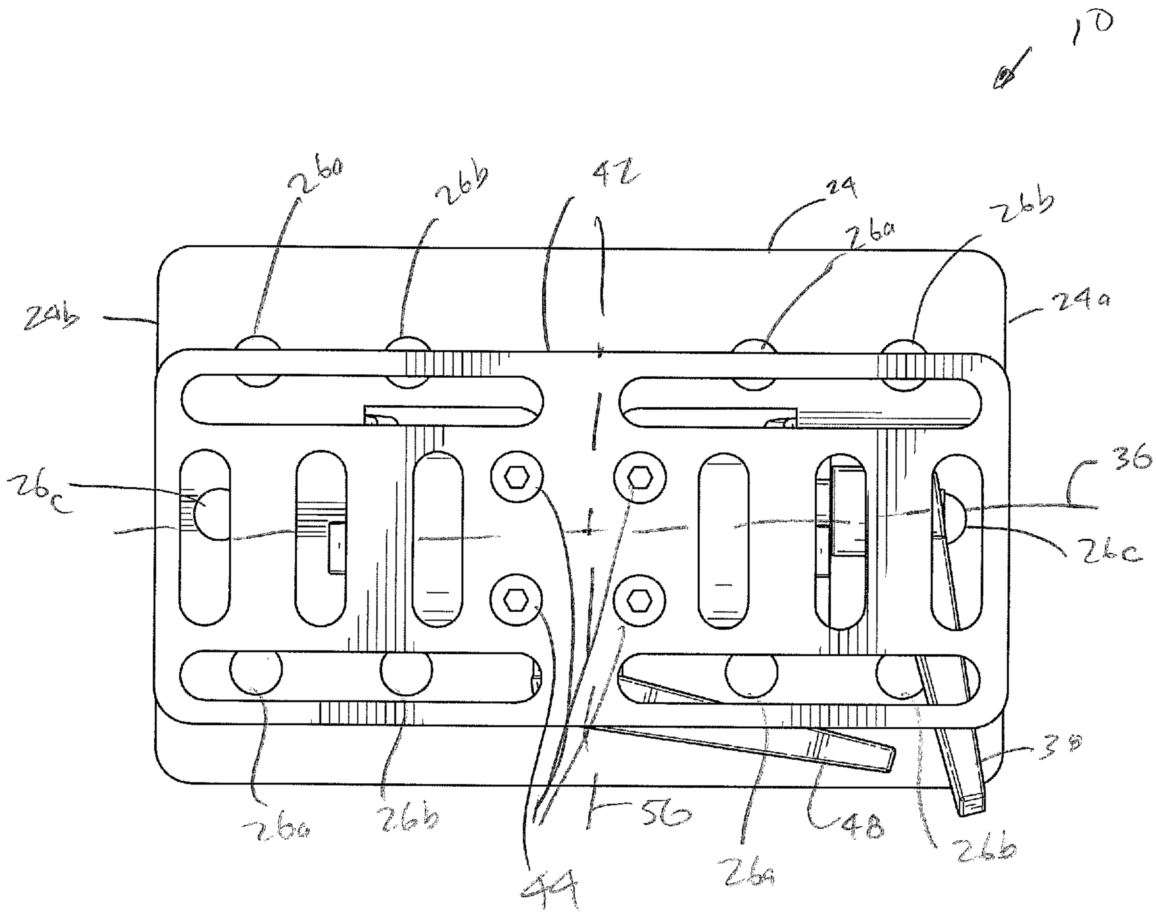
FIG. 8 is a top view as in FIG. 7, but with the speaker plate at the top of the assembly attached with an orientation rotated 90 degrees relative to the rest of the assembly.
Figure 9:
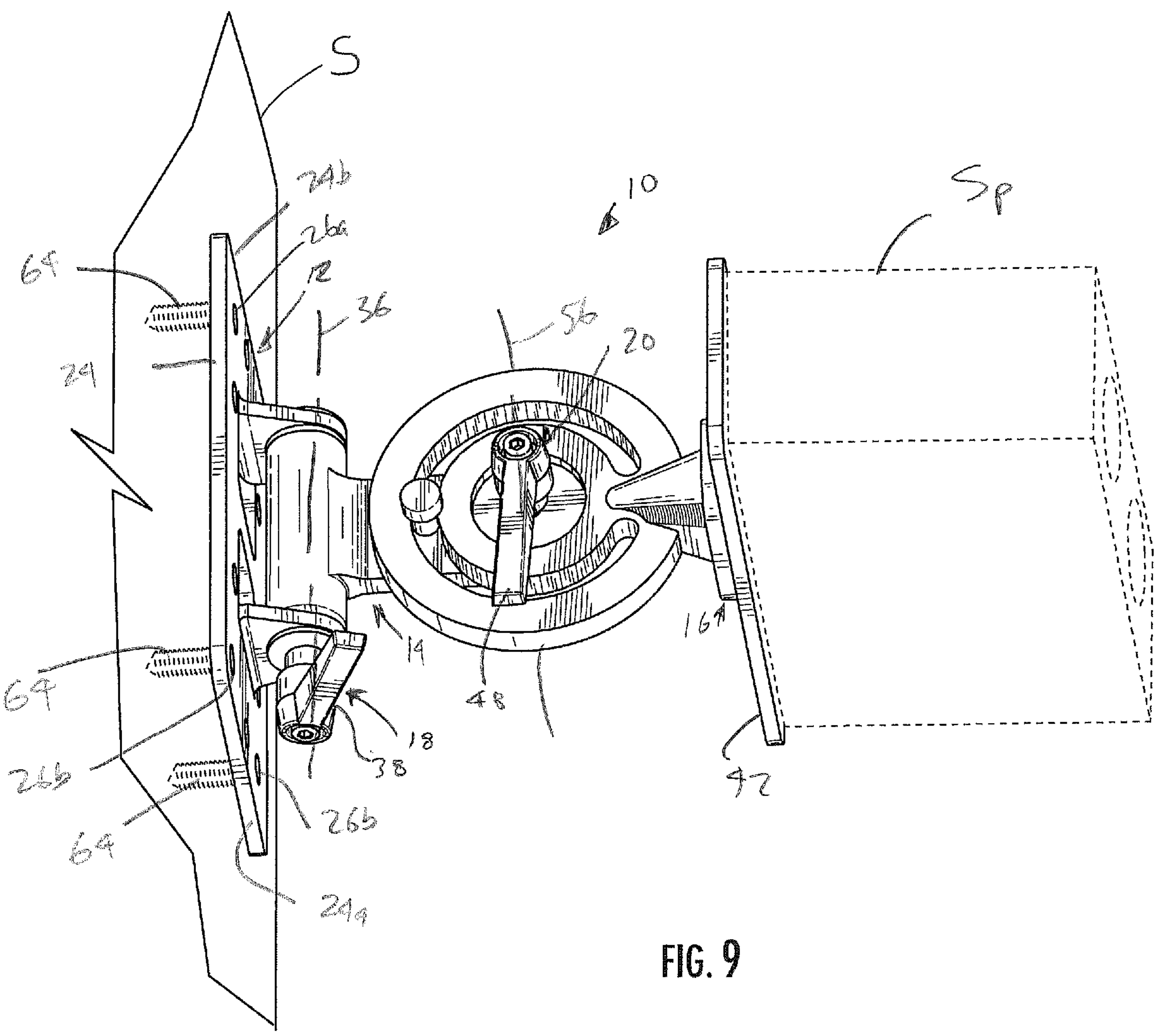
FIG. 9 is a perspective view of a dual-axis swivel speaker mount assembly according to FIG. 1, mounted to a surface such as a wall and holding a representative small speaker.
Figure 10:
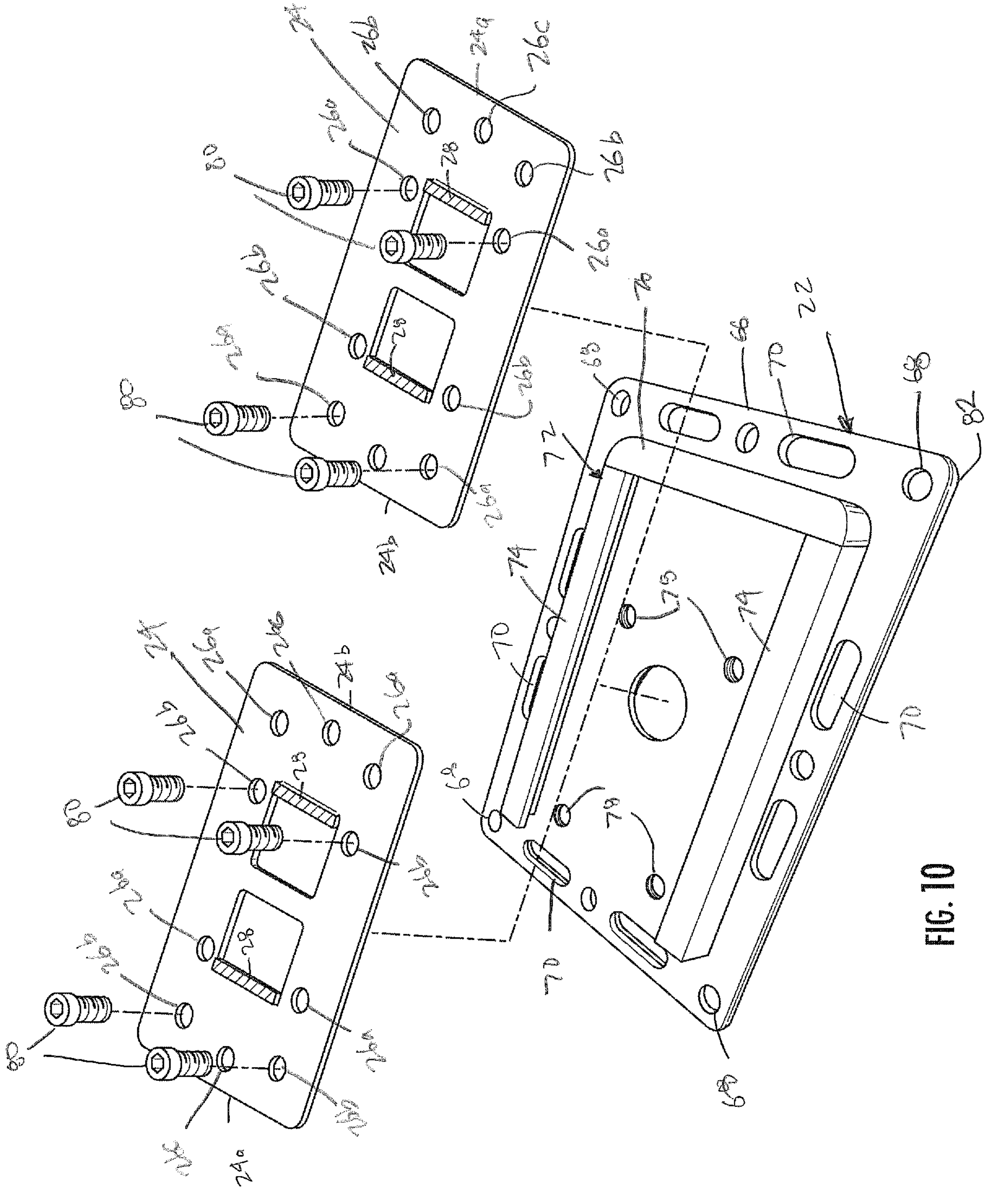
FIG. 10 is a perspective exploded view of a mounting plate usable with the speaker mount assembly of FIG. 1, showing an indication of two possible assembly orientations.
Figure 11A:
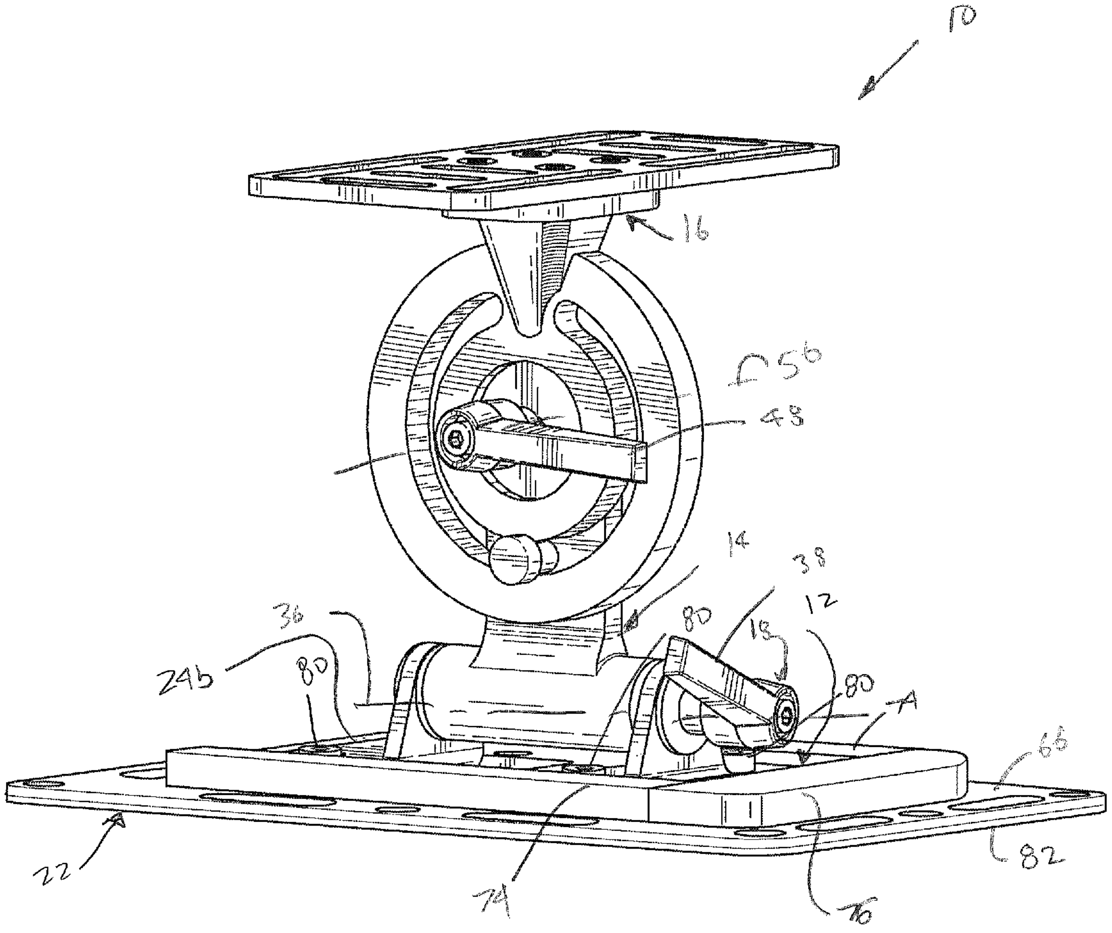
FIGS. 11A and 11B are perspective views of the speaker mount assembly and mounting plate in both assembly orientations.
Figure 11B:
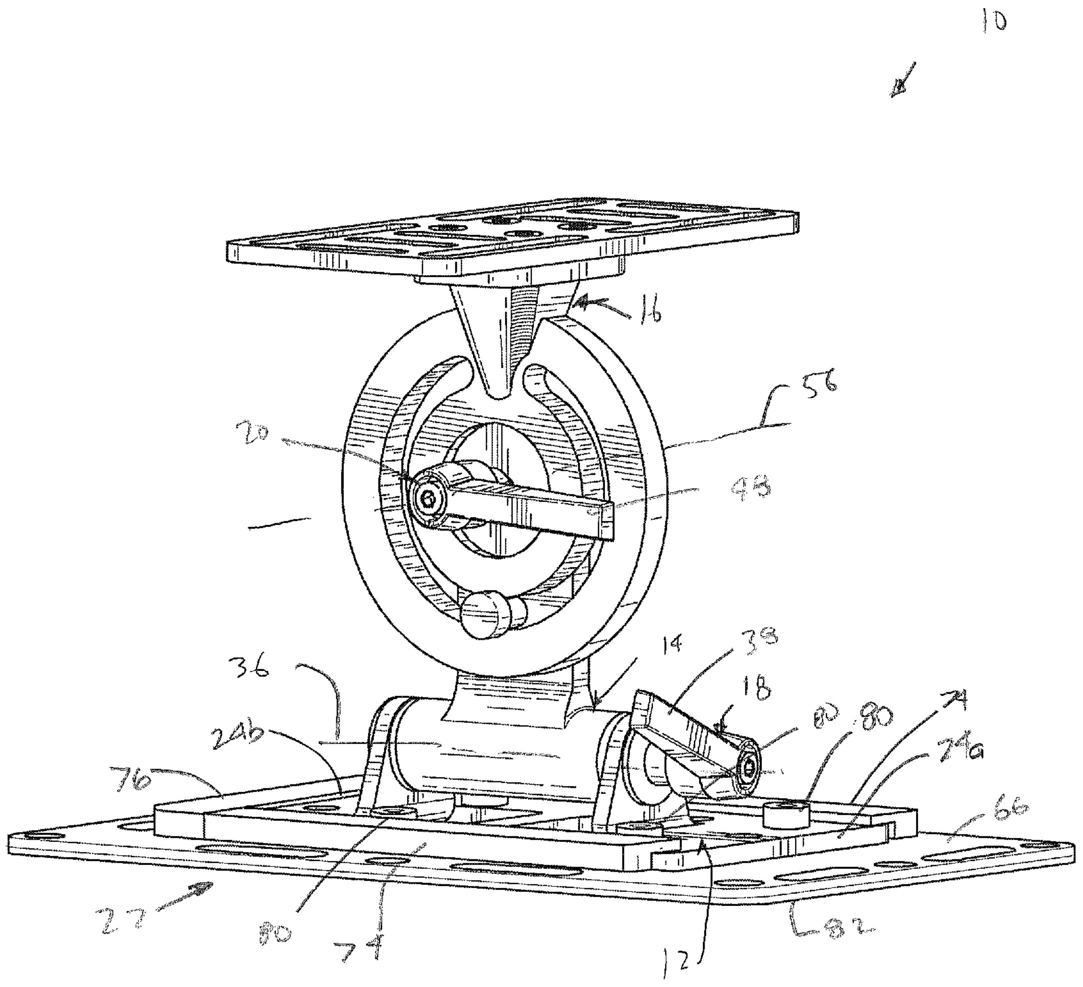
Figure 12:
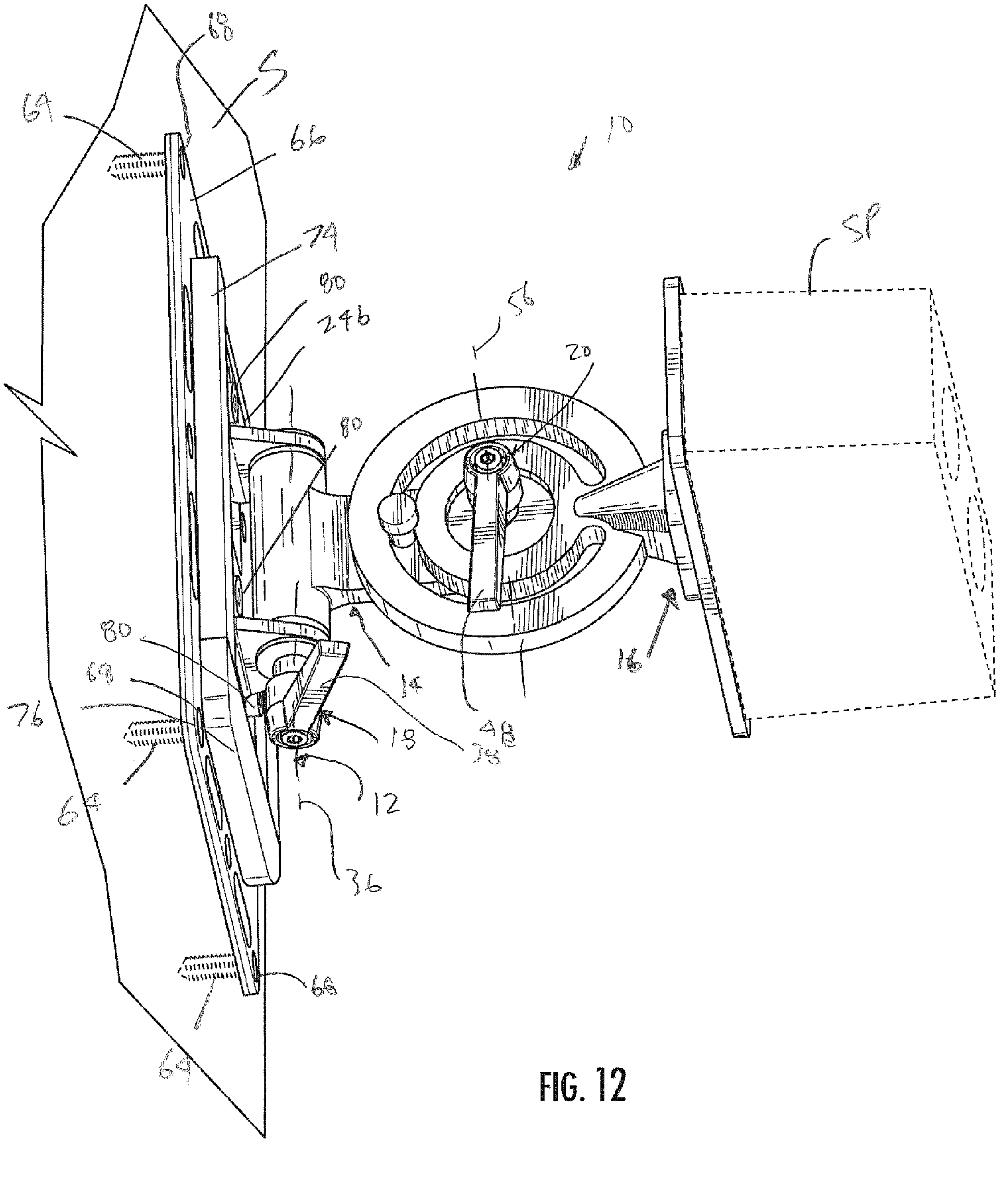
FIG. 12 is a perspective view as in FIG. 9, with the mounting plate mounted to the surface and the speaker mount assembly mounted to the mounting plate.

More particularly, as shown in FIGS. 1-12, one example of a dual-axis swivel speaker mount assembly 10 may include some or all of a base section 12, a central section 14, a speaker section 16, a first lockable pivot assembly 18, and a second lockable pivot assembly 20. As shown in FIG. 10, assembly 10 may be mounted directly to a support S (sch as a wall, ceiling, frame, etc.); as shown in FIG. 12, optionally assembly 10 may be mounted to a mounting plate 22, which is itself mounted to support S.

Base section 12 includes a base plate 24 with holes 26*a-c*, and upright flanges 28. Central section 14 includes a cylindrical portion 30 and a plate portion 32. First lockable pivot assembly 18 connects the base section 12 and the central section 14 via a first axle 34 extending through flanges 28 along axis 36. A knob 38 is selectively tightenable or loosenable via mutual threading onto axle 34 (or as shown a jackshaft 35 held in place by screw 37 or other extension rotatable with axle 34), so that, once loosened central section 14 is rotatable relative to base section 12 around first axis 36, and once tightened no such rotation is permitted due to an axial squeeze along axis 36. If desired, mutual frictional enhancing elements such as stops, teeth, detents, etc., may be used to define specific relative rotation amounts and enhance frictional gripping once knob is tightened.

Figure 7:
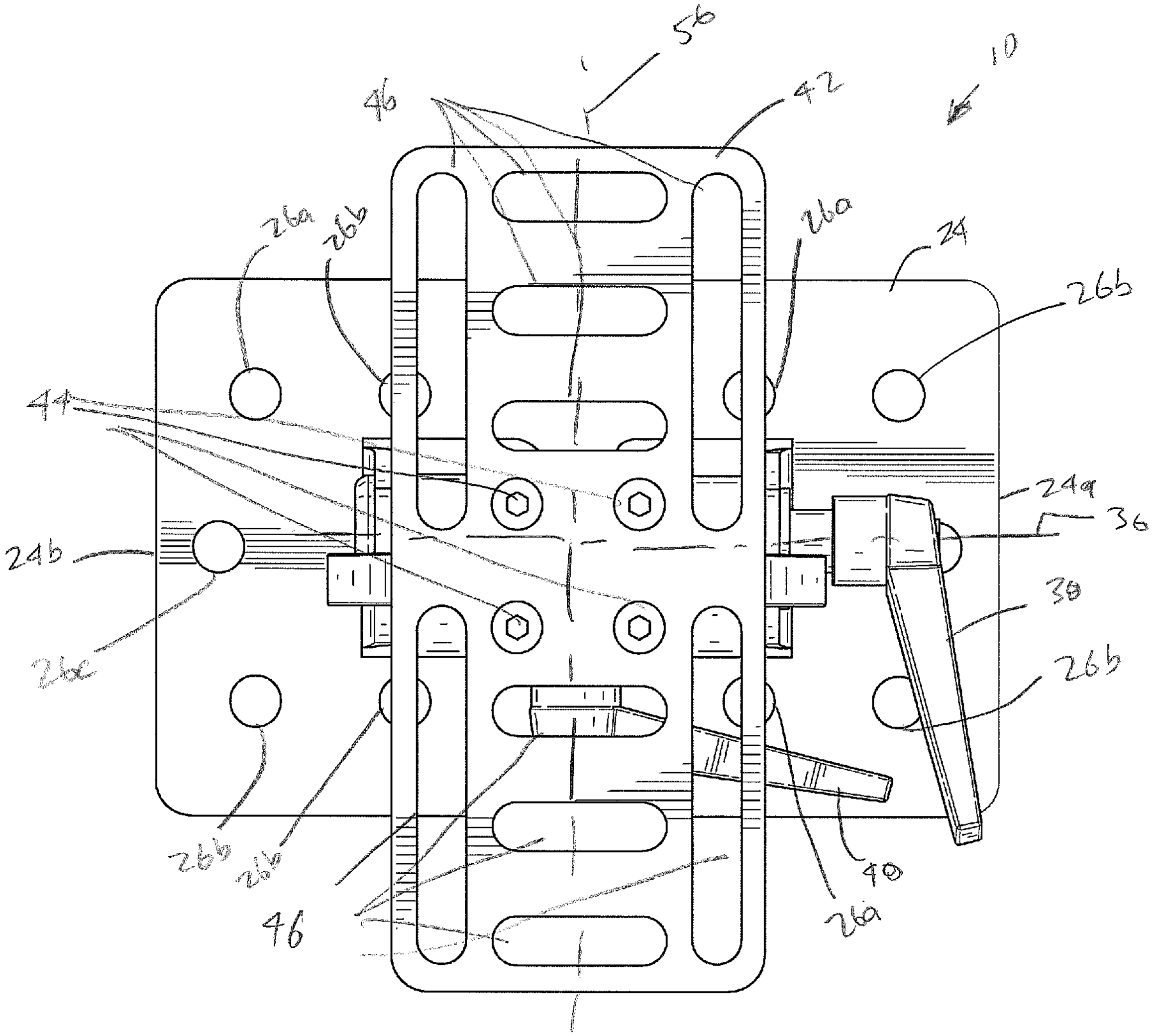
FIG. 7 is a top view of the dual-axis swivel speaker mount assembly as shown in FIG. 1.

Speaker section 16 includes a plate portion 40 and a speaker plate 42 for attachment to the plate portion by screws 44. Note that, if desired, holes for the screws may be arranged on plate portion 40 and speaker plate 42 so that the parts are attachable together in more than one relative orientation. Such could be useful for providing additional mounting options. For example, FIGS. 7 and 8 show plate 42 attached to portion 40 in two orientations, 90 degrees apart. Speaker plate 42 may have multiple openings 46 (slots and/or holes) with many different spacings configured for mounting multiple speakers, mounts, brackets, extension pole housings, etc., so as to be adaptable to products from many manufacturers.

The second lockable pivot assembly 20 functions similarly to the first, with a knob 48, second axle 50, jackshaft 52, screw 54 and internal threading for selectively loosening or tightening the assembly along second axis 56. When loosened, assembly 20 allows pivoting of speaker section 16 relative to central section 14 about second axis 56. When tightened, assembly 20 frictionally squeezes the elements along second axis 56 to prevent rotation about axis 56. A pin 58 riding in a groove 60 in plate portion 40 extending circumferentially around second axis 56 helps guide and align central section 14 and speaker section 16 during rotation and fixation. Frictional elements 62 between plate portion 40 and plate portion 32 (shown as radially extending teeth) help define relative locations of the parts and secure against rotation once assembly 20 is tightened by knob 48.

Figure 2A:
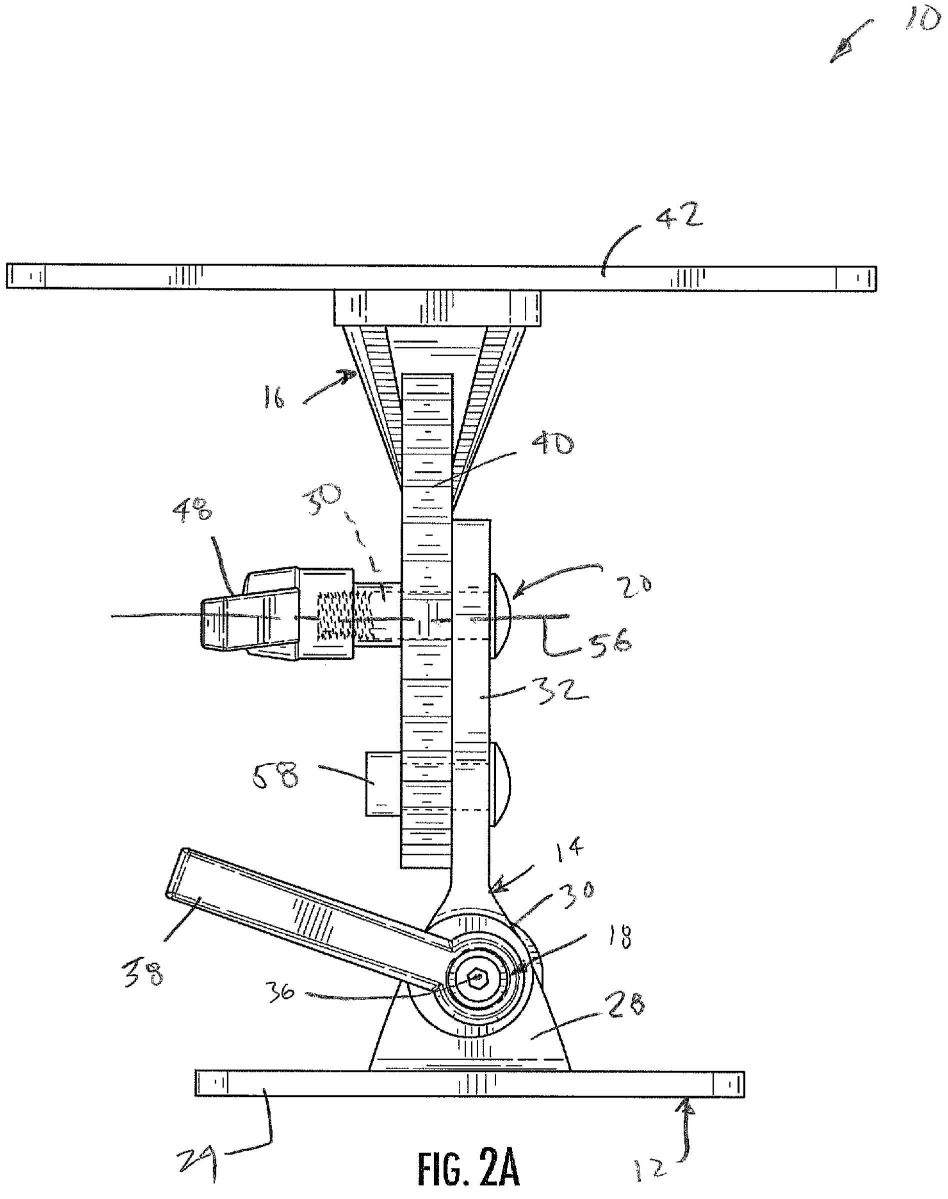
FIG. 2A is a right-side view of the dual-axis swivel speaker mount assembly as shown in FIG. 1.
Figure 2B:
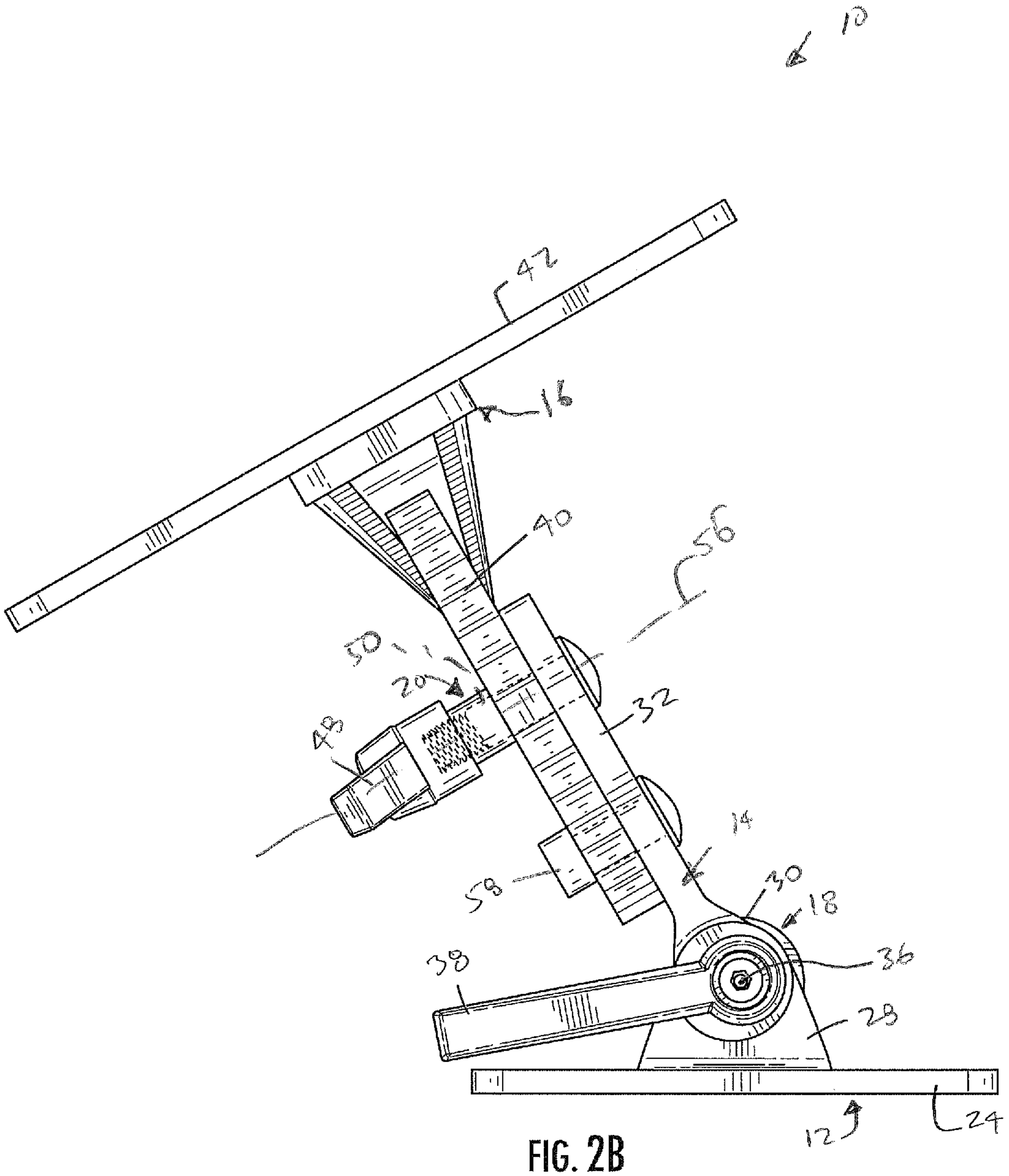
FIGS. 2B and 2C are right-side views as in FIG. 2A, but with a first part of the assembly pivoted respectively counterclockwise and clockwise.
Figure 2C:
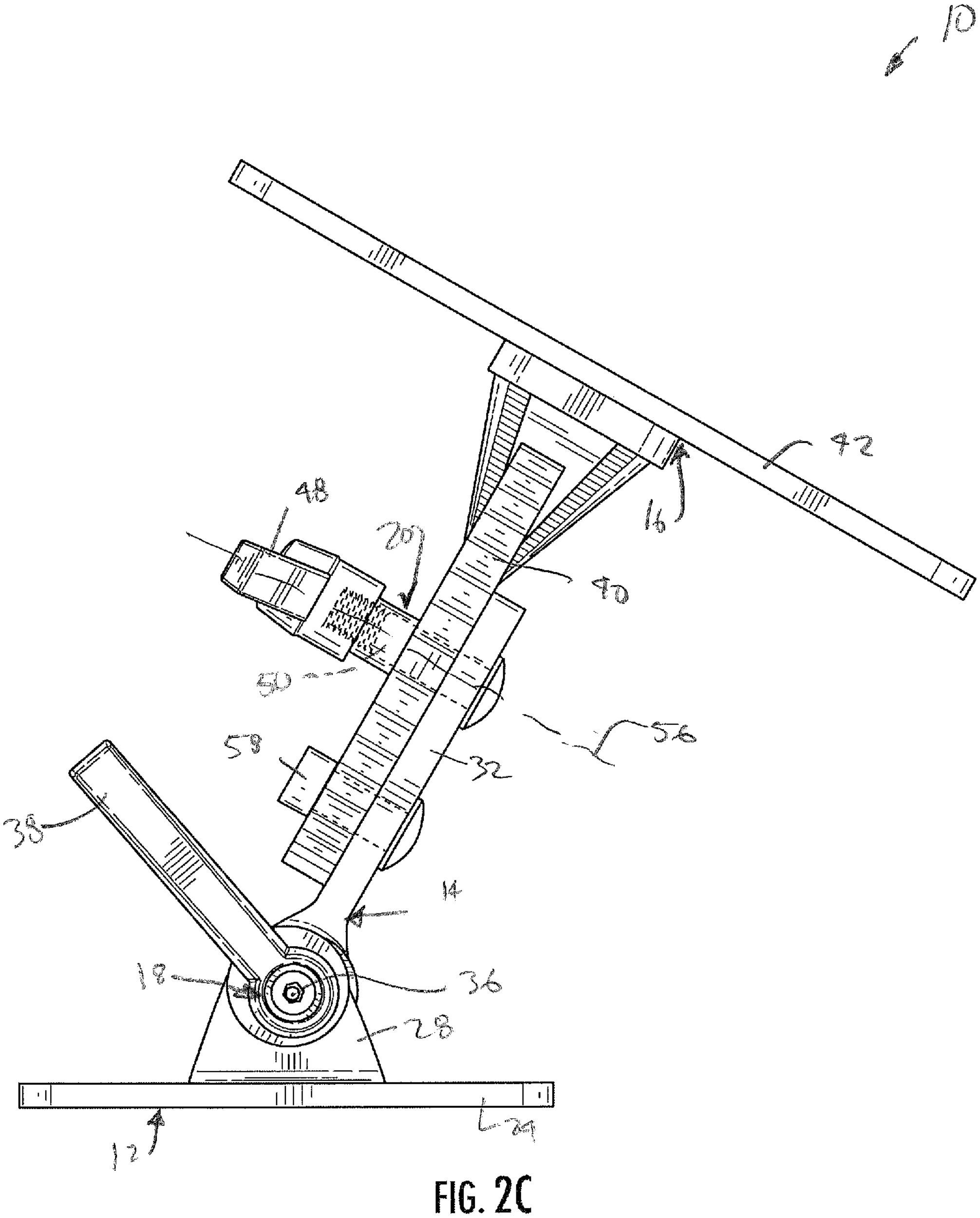
Figure 3A:
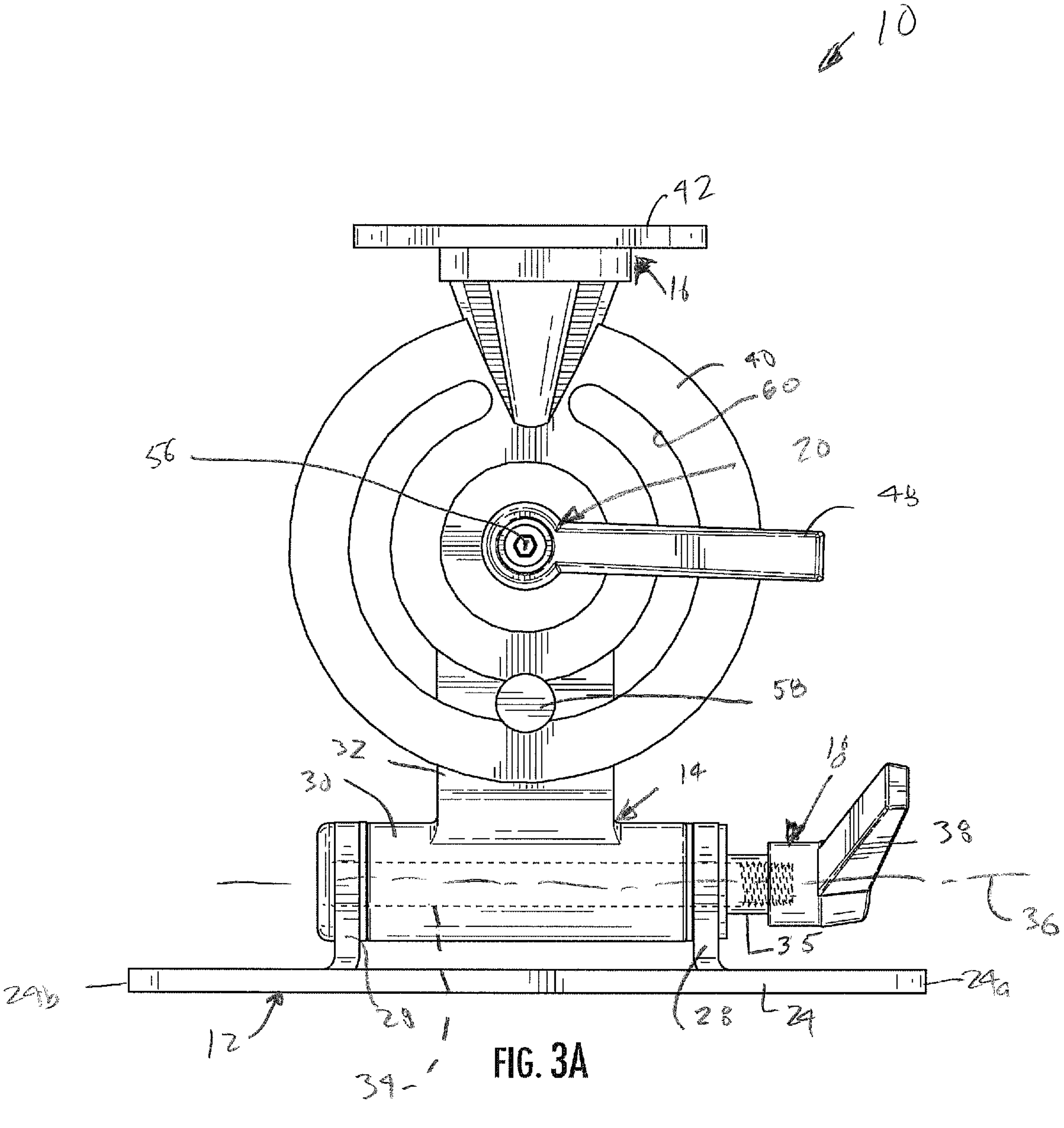
FIG. 3A is a front view of the dual-axis swivel speaker mount assembly as shown in FIG. 1.
Figure 3B:
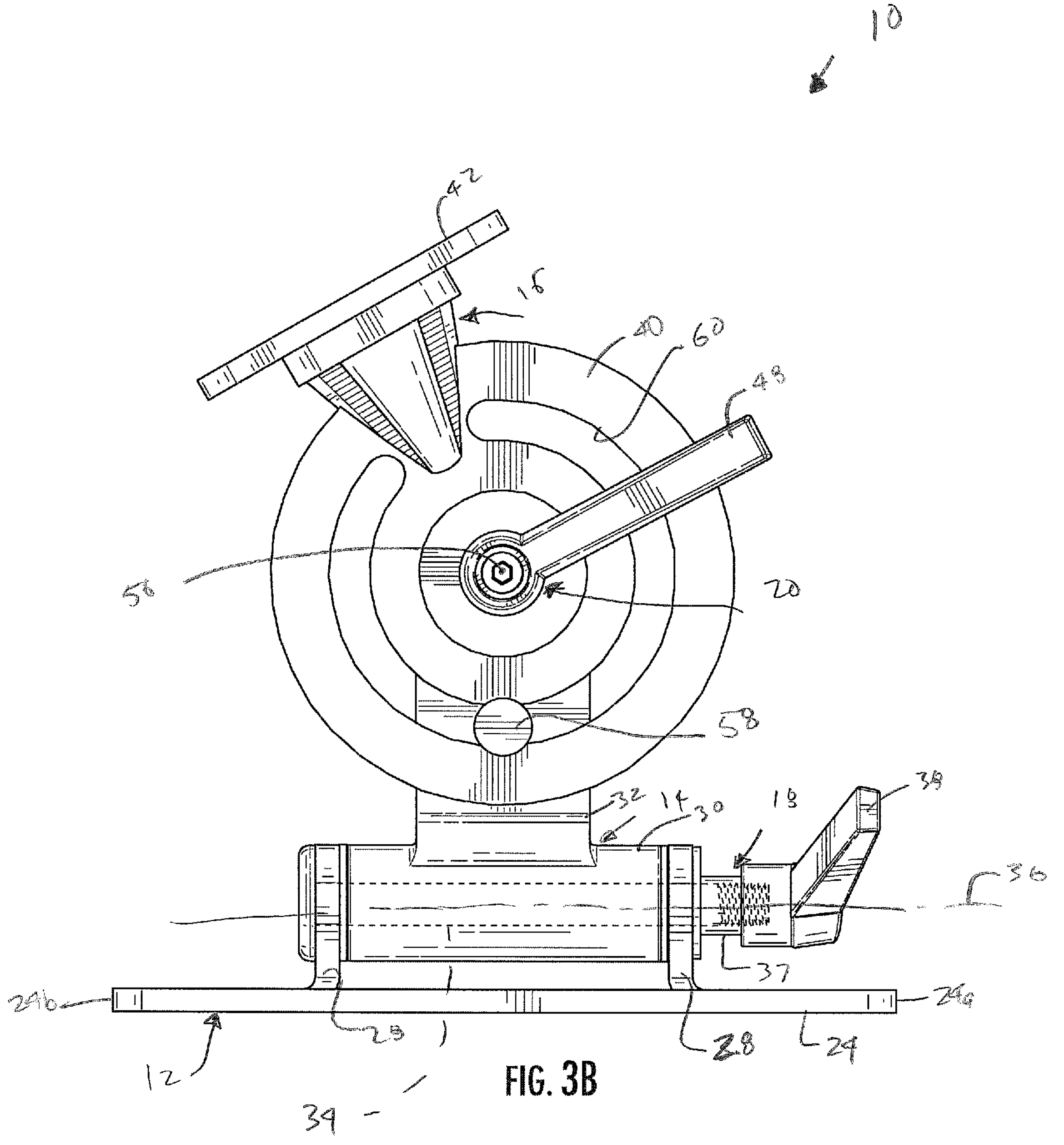
FIGS. 3B and 3C are front views as in FIG. 3A, but with a second part of the assembly pivoted respectively counterclockwise and clockwise.
Figure 3C:
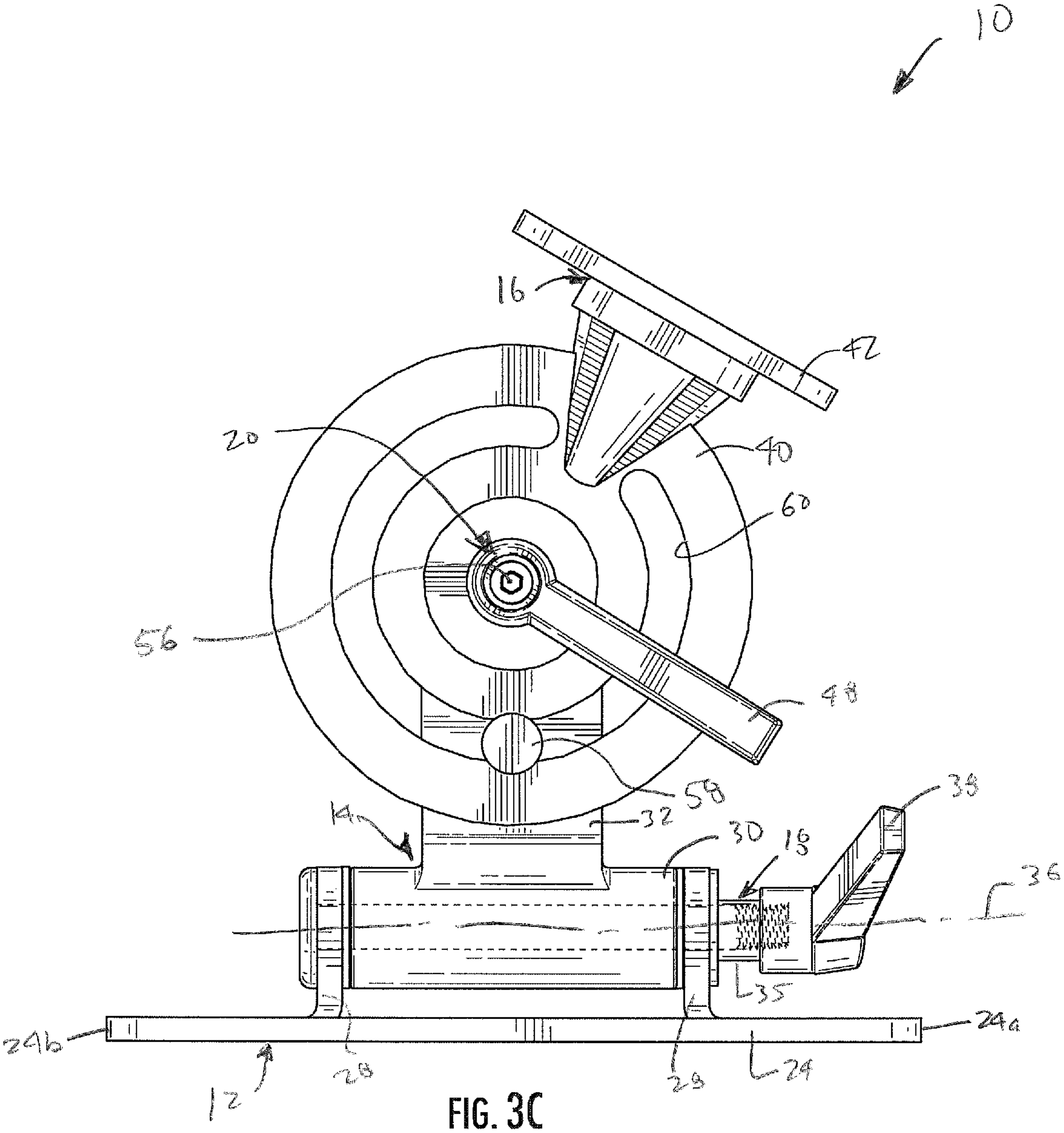
Figure 4:
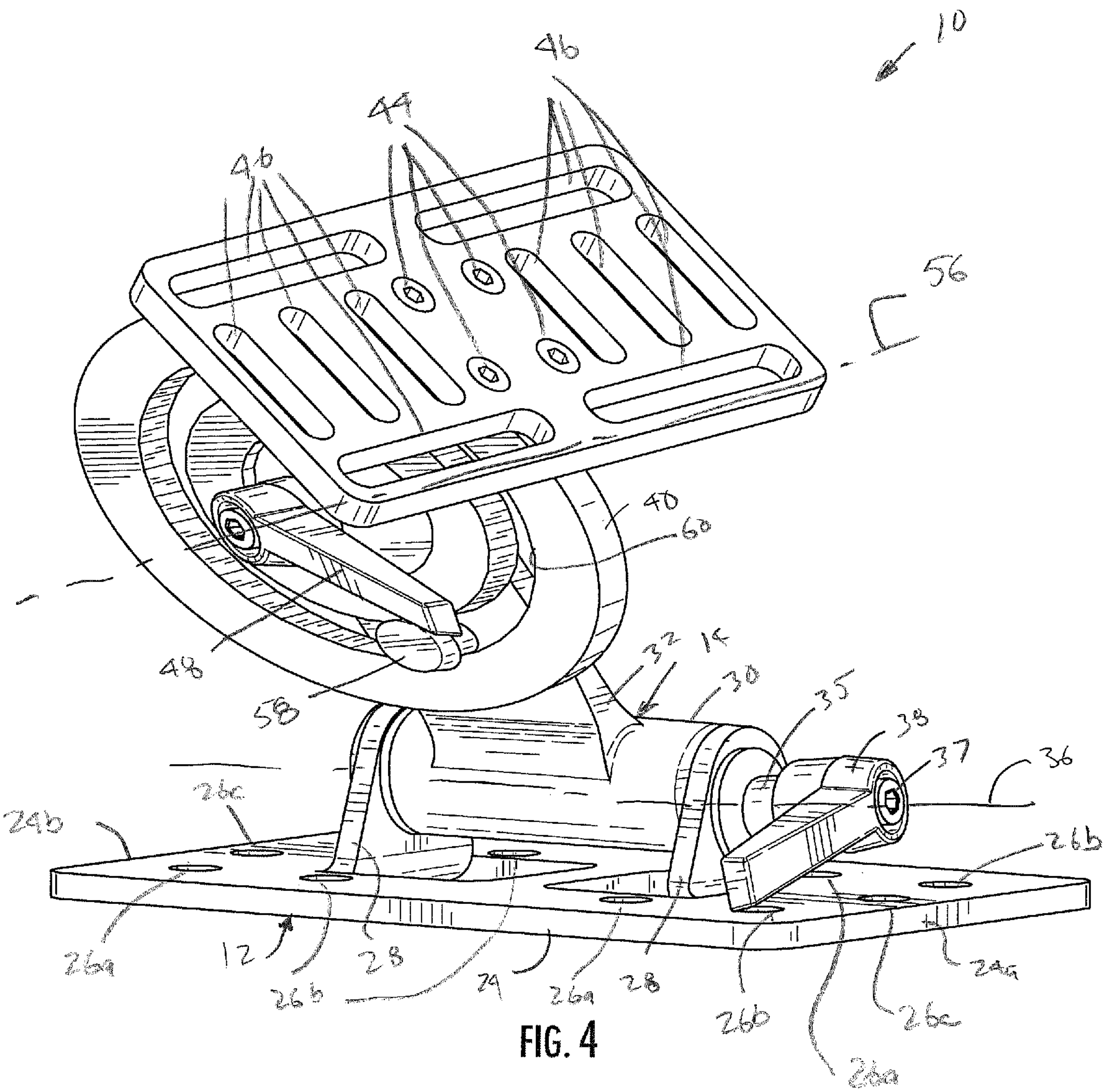
FIG. 4 is a front perspective view as in FIG. 1, but with both the first part of the assembly and the second part of the assembly pivoted respectively counterclockwise and clockwise.
Figure 5:
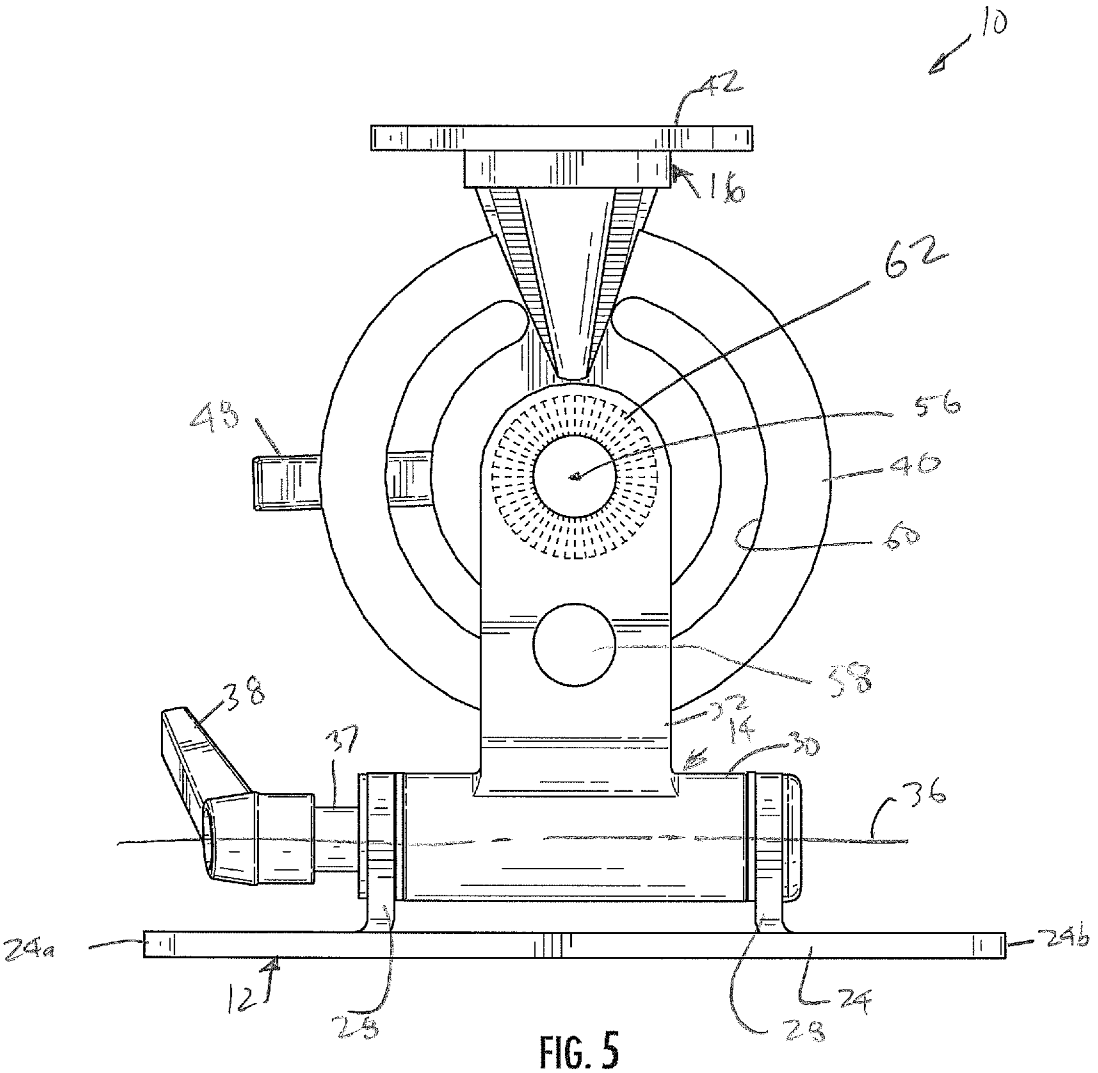
FIG. 5 is a rear view of the dual-axis swivel speaker mount assembly as shown in FIG. 1.
Figure 6:
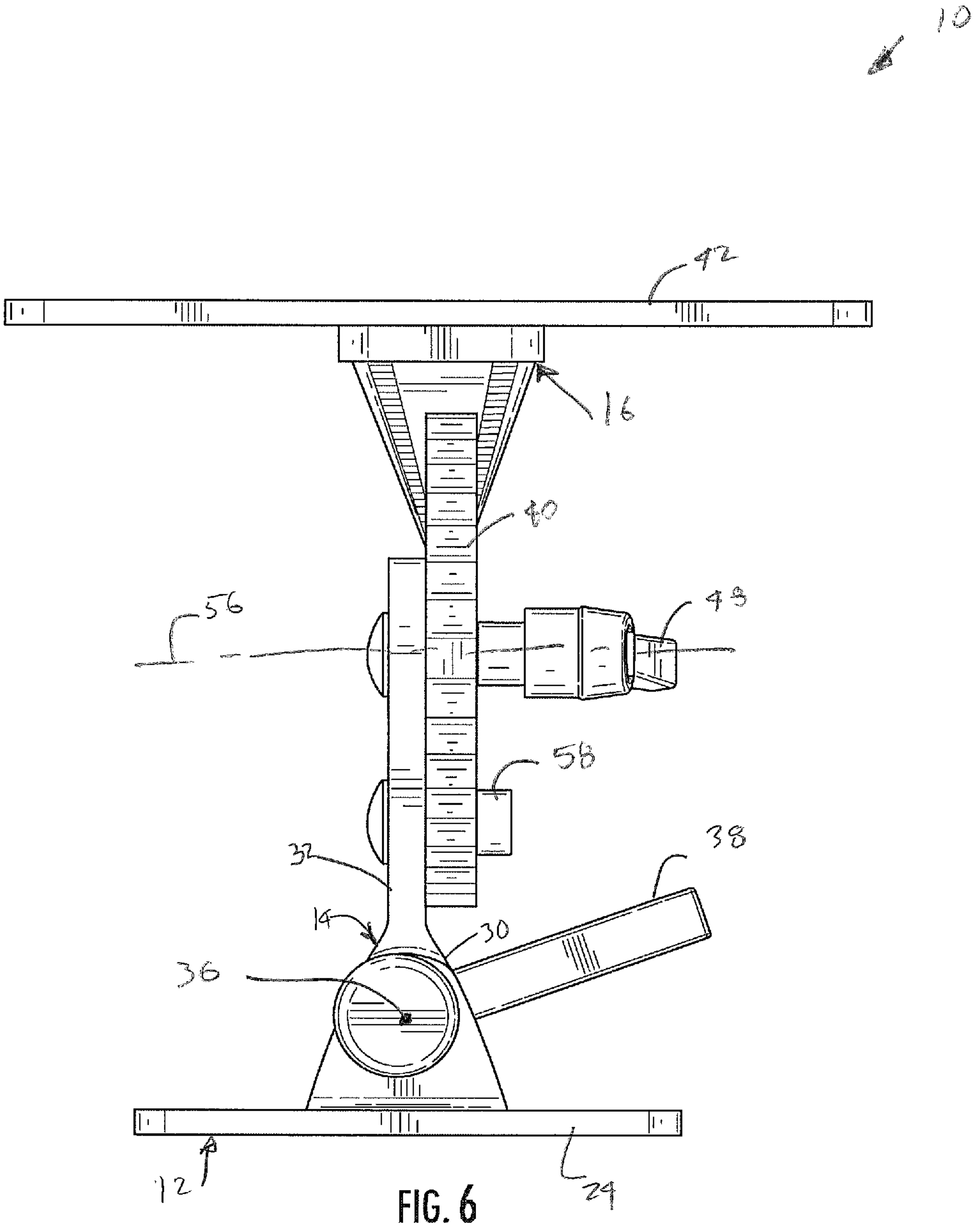
FIG. 6 is a side view of the dual-axis swivel speaker mount assembly as shown in FIG. 1.

FIGS. 2A, 2B, and 2C show three possible relative positionings of central section 14 relative to base section 12, roughly at 30-degree intervals by rotating around axis 36 and fixing in place with knob 38. FIGS. 3A, 3B, and 3C show three possible relative positionings of speaker section 16 relative to central section 14, also roughly at 30-degree intervals, by rotating around axis 56 and fixing with knob 48. FIG. 4 shows one possible orientation of speaker section 16 relative to base section 12, wherein rotation around both axes 36 and 56 has been done. Assembly 10 thus provides a simple and optimal rotation, fixable by a single lockable pivot assembly at each pivot axis. Due to the adjustability about axes 36 and 56, assembly may be oriented in multi fashions relative to support S, so that reaching knobs 38 and 48 for tightening, loosening, adjustment, etc. is simple.

Base plate 16 may be mounted to support S using screws 64 through any or all of holes 26*a-c*. As shown in FIG. 9, plate 16 is mounted using two of holes 26*a* and two of holes 26*b* (i.e., the holes closest to the corners of plate 24 to hold up a speaker Sp attached to plate 42.

However, FIGS. 10-12 show an optional mounting plate 22 that can provide added ease of installation and functionality. Mounting plate 22 includes a plate 66 with perimeter holes 68 and slots 70 for mounting to support S (again, wall, ceiling, frame, structure, etc.). Base plate 24 can be slid into and retained by a U-shaped lip 72 on plate 66 having L-shaped (undercut) side sections 74. Base plate 24 can be slid in either with side 24*a* or side 24*b* contacting bottom 76 of U shaped lip 72. FIGS. 11A and 11B show the alternate relative orientation (in which the mounting plate 22 orientation is reversed between the figures).

Plate 66 includes four threaded holes 78 arranged to receive either holes 26*a* or holes 26*b*, depending on whether side 24*a* or side 24*b* was slid into U shaped lip to contact bottom 76. Threaded screws 80 can secure base plate 24 to plate 66, extending through either holes 26*a* or 26*b* and threaded into holes 78. If desired, holes 78 may be symmetrically located and only one set of holes 26*a* or 26*b* (symmetrically located as well) could be employed. Antivibration foam layer 82 may be located on bottom of plate 66 so that when secured to support, S vibrations caused by the speaker Sp or other acoustic items in a room in general are reduced.

The above structure thus provides one or more examples of a dual-axis swivel speaker mount assembly that could be used to mount a speaker to a support structure in a desired orientation, pivotable about two axes relative to the base/support, and reliably securable in the desired orientation, either with or without an added mounting plate.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

The invention claimed is:

1. A dual-axis swivel speaker mount assembly for mounting a speaker to a supporting object, the dual-axis swivel speaker mount assembly comprising:

a base section for attachment to the supporting object;

a central section;

a speaker section for attachment to the speaker;

a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section; and a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section;

wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions;

wherein the speaker section includes a plate portion and a speaker portion, the second axle extending through the plate portion; and wherein the plate portion defines an arcuate groove extending circumferentially around the second axis, and the central section defines a pin extending through the arcuate groove configured to guide and secure the plate portion relative to the central section when the speaker section is pivoted relative to the central section, the pin being located between the first axle and the second axle.

2. The dual-axis swivel speaker mount assembly of claim 1, wherein the base section includes a base plate defining holes therethrough and two flanges extending upright from the base plate, the first axle extending though the two flanges.

3. The dual-axis swivel speaker mount assembly of claim 1, wherein the base section includes a base plate defining a plurality of holes therethrough, the holes including two groupings disposed symmetrically and overlappingly relative to a cross-axis in a middle of the base plate.

4. The dual-axis swivel speaker mount assembly of claim 3, wherein the groupings of holes include a first grouping of four holes and a second grouping of four holes.

5. The dual-axis swivel speaker mount assembly of claim 4, further including a mounting plate, the mounting plate having mounting holes located around a periphery thereof for mounting the mounting plate to the supporting object, the mounting plate having a U-shaped lip sized for slidingly receiving the base plate therein in either a first orientation or a second orientation.

6. The dual-axis swivel speaker mount assembly of claim 5, wherein the mounting plate defines four holes therethrough, the first grouping of holes aligning with the four holes of the mounting plate when the base plate is in the first orientation, the second grouping of holes aligning with the four holes of the mounting plate when the base plate is in the second orientation.

7. The dual-axis swivel speaker mount assembly of claim 6, wherein the four holes are threaded, and further including threaded fasteners for securing the base plate to the mounting plate using either the first grouping of holes or the second grouping of holes and the four holes.

8. The dual-axis swivel speaker mount assembly of claim 5, wherein in the first orientation the first knob is at a first end of the mounting plate, and in the second orientation the first knob is at a second end of the mounting plate.

9. The dual-axis swivel speaker mount assembly of claim 5, wherein the U-shaped lip is on a top surface of the mounting plate, and further including a vibration reducing pad on a bottom surface of the mounting plate for contacting the surface onto which the mounting plate is mounted.

10. The dual-axis swivel speaker mount assembly of claim 1, wherein the central section includes a cylindrical portion and a plate portion, the first axle extending through the cylindrical portion, the second axle extending through the plate portion.

11. The dual-axis swivel speaker mount assembly of claim 1, wherein friction enhancing surface elements are located at a contact portion of the speaker section and a contact portion of the central section for enhancing the locking of the speaker section relative to the central section when locked by the second lockable pivot assembly.

12. The dual-axis swivel speaker mount assembly of claim 1, wherein the speaker portion is removably mountable to the plate portion in a first orientation and a second orientation, the first orientation being located at 90 degrees rotation from the second orientation.

13. A dual-axis swivel speaker mount assembly for mounting a speaker to a supporting object, the dual-axis swivel speaker mount assembly comprising:

a base section for attachment to the supporting object, the base section including a base plate;

a central section;

a speaker section for attachment to the speaker;

a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section;

a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section;

wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions; and a mounting plate having mounting holes located around a periphery thereof for mounting the mounting plate to the supporting object, the mounting plate having a U-shaped lip sized for slidingly receiving the base plate therein in either a first orientation or a second orientation;

wherein in the first orientation the first knob is at a first end of the mounting plate, and in the second orientation the first knob is at a second end of the mounting plate; and openings defined though the base plate and the mounting plate that are aligned in either the first orientation or the second orientation for receiving fasteners to fix the base plate to the mounting plate in either the first orientation or the second orientation;

wherein the speaker section includes a plate portion and a speaker portion, the second axle extending through the plate portion; and wherein the plate portion defines an arcuate groove extending circumferentially around the second axis, and the central section defines a pin extending through the arcuate groove configured to guide and secure the plate portion relative to the central section when the speaker section is pivoted relative to the central section, the pin being located between the first axle and the second axle.

14. The dual-axis swivel speaker mount assembly of claim 13, wherein the base plate defines two flanges extending upright from the base plate, the first axle extending though the two flanges.

15. The dual-axis swivel speaker mount assembly of claim 14, wherein the U-shaped lip is on a top surface of the mounting plate, and further including a vibration reducing pad on a bottom surface of the mounting plate for contacting the surface onto which the mounting plate is mounted.

16. The dual-axis swivel speaker mount assembly of claim 13, wherein the speaker portion is removably mountable to the plate portion in a first orientation and a second orientation, the first orientation being located at 90 degrees rotation from the second orientation.

17. A dual-axis swivel speaker mount assembly for mounting a speaker to a supporting object, the dual-axis swivel speaker mount assembly comprising:

a base section for attachment to the supporting object;

a central section;

a speaker section for attachment to the speaker;

a first lockable pivot assembly connecting the base section and the central section pivotably about a first axle having a first axis extending longitudinally along the first axle, the first lockable pivot assembly including a first knob, threading on the first axle mating with threading in an opening in the first knob, rotation of the first knob on the second axle selectively in a locking direction or an unlocking direction respectively locking or unlocking the central section relative to the base section;

a second lockable pivot assembly connecting the central section to the speaker section pivotably about a second axle having a second axis extending longitudinally along the second axle, the second lockable pivot assembly including a second knob, threading on the second axle mating with threading in an opening in the second knob, rotation of the second knob on the second axle selectively in a locking direction or an unlocking direction respectively locking or unlocking the speaker section relative to the central section;

wherein the second axis is spaced from and aligned in a perpendicular orientation relative to the first axis when viewed from a viewpoint distal to the speaker section and aligned with the first axis and the second axis, the speaker section being selectively and securably orientable relative to the base section by pivoting at least one of the first lockable pivot assembly and the second lockable pivot assembly and then rotating the first knob and the second knob in the respective locking directions;

the base section further including a base plate defining a plurality of holes therethrough, the holes including two groupings disposed symmetrically and overlappingly relative to a cross-axis in a middle of the base plate, the groupings of holes including a first grouping of four holes and a second grouping of four holes; and a mounting plate having mounting holes located around a periphery thereof for mounting the mounting plate to the supporting object, the mounting plate having a U-shaped lip sized for slidingly receiving the base plate therein in either a first orientation or a second orientation;

wherein the mounting plate further defines four holes therethrough, the first grouping of holes aligning with the four holes of the mounting plate when the base plate is in the first orientation, the second grouping of holes aligning with the four holes of the mounting plate when the base plate is in the second orientation;

wherein in the first orientation the first knob is at a first end of the mounting plate, and in the second orientation the first knob is at a second end of the mounting plate;

wherein the speaker section includes a plate portion and a speaker portion, the second axle extending through the plate portion; and wherein the plate portion defines an arcuate groove extending circumferentially around the second axis, and the central section defines a pin extending through the arcuate groove configured to guide and secure the plate portion relative to the central section when the speaker section is pivoted relative to the central section, the pin being located between the first axle and the second axle.

18. The dual-axis swivel speaker mount assembly of claim 17, wherein the base section defines two flanges extending upright from the base plate, the first axle extending though the two flanges.

19. The dual-axis swivel speaker mount assembly of claim 17, wherein the U-shaped lip is on a top surface of the mounting plate, and further including a vibration reducing pad on a bottom surface of the mounting plate for contacting the surface onto which the mounting plate is mounted.

20. The dual-axis swivel speaker mount assembly of claim 17, wherein the speaker portion is removably mountable to the plate portion in a first orientation and a second orientation, the first orientation being located at 90 degrees rotation from the second orientation.

* * * * *